United States Patent
McMillan et al.

(10) Patent No.: US 12,413,411 B2
(45) Date of Patent: Sep. 9, 2025

(54) EMULATED NETWORK RESPONSE

(71) Applicant: Hewlett-Packard Development Company, L.P., Spring, TX (US)

(72) Inventors: Erich Wolfgang Gestacker McMillan, Spring, TX (US); Tevin Jaupaul Richards, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 33 days.

(21) Appl. No.: 18/684,788

(22) PCT Filed: Sep. 22, 2021

(86) PCT No.: PCT/US2021/051455
§ 371 (c)(1),
(2) Date: Feb. 19, 2024

(87) PCT Pub. No.: WO2023/048706
PCT Pub. Date: Mar. 30, 2023

(65) Prior Publication Data
US 2024/0430095 A1   Dec. 26, 2024

(51) Int. Cl.
| | |
|---|---|
| *H04L 9/32* | (2006.01) |
| *G06F 9/4401* | (2018.01) |
| *G06F 15/167* | (2006.01) |
| *G06F 21/78* | (2013.01) |
| *H04L 9/40* | (2022.01) |

(52) U.S. Cl.
CPC .......... *H04L 9/3226* (2013.01); *G06F 9/4416* (2013.01); *G06F 15/167* (2013.01); *G06F 21/78* (2013.01); *H04L 63/0272* (2013.01)

(58) Field of Classification Search
CPC . H04L 9/3226; H04L 63/0272; G06F 9/4416; G06F 15/167; G06F 21/78
See application file for complete search history.

(56) References Cited

U.S. PATENT DOCUMENTS

| | | | |
|---|---|---|---|
| 7,565,529 B2 | 7/2009 | Beck et al. | |
| 9,141,802 B2* | 9/2015 | Yao | .......... G06F 21/79 |
| 9,654,980 B2 | 5/2017 | Mazzarella et al. | |
| 2002/0186845 A1 | 12/2002 | Dutta et al. | |
| 2006/0155988 A1 | 7/2006 | Hunter et al. | |
| 2012/0116602 A1 | 5/2012 | Vaswani et al. | |
| 2015/0026471 A1 | 1/2015 | Cha et al. | |
| 2016/0110546 A1 | 4/2016 | Yao et al. | |
| 2016/0180102 A1* | 6/2016 | Kim | ..... G06F 12/1408 713/164 |
| 2018/0285570 A1* | 10/2018 | Leblanc | ........ G01N 27/44791 |
| 2019/0013947 A1 | 1/2019 | Rogers et al. | |
| 2020/0076598 A1* | 3/2020 | Masters | ............ G06F 21/6209 |
| 2022/0035904 A1* | 2/2022 | Bursell | ................ H04L 63/10 |
| 2022/0391512 A1* | 12/2022 | Sethi | ................ G06F 21/575 |

FOREIGN PATENT DOCUMENTS

WO    2020/028909 A1    2/2020

* cited by examiner

*Primary Examiner* — Glenn A. Auve
(74) *Attorney, Agent, or Firm* — Quarles & Brady LLP

(57) ABSTRACT

An example storage medium is described, wherein the storage medium comprises instructions that, when executed, cause a processor of an electronic device to determine whether data private key is stored in a first memory of the electronic device and whether a network connection is available. If the private key is stored and no network is available, emulated responses of a networked service are generated for decryption of data in the electronic device.

15 Claims, 9 Drawing Sheets

EMULATED NETWORK RESPONSE

BACKGROUND

Computing devices such as desktop computers, notebook computers, tablets, smart phones, etc, include instructions stored in a memory that are to initialize hardware in the computing device. Initializing hardware may include initializing storage devices that are encrypted to provide security for the data stored in the storage devices.

BRIEF DESCRIPTION OF THE DRAWINGS

Various example features will be apparent from the detailed description which follows, taken in conjunction with the accompanying drawings, wherein:

FIG. 1b is an example method of operation of the electronic device of FIG. 1a.

FIG. 2b is an example method of operation of the electronic device of FIG. 2a.

FIG. 3b is an example method of operation of the electronic device of FIG. 3a.

FIG. 4b is an example method of operation of the electronic device of FIG. 4a.

DETAILED DESCRIPTION

For security reasons, storage devices for computing devices may employ encryption wherein the contents of the storage device are encrypted prior to storage so that unauthorized access of the contents can be blocked. An example of such an encryption system is Bitlocker™. Encrypted storage devices can be accessed by a password to be input under certain circumstances. To avoid a user needing to input the password each time that they wish to access data in the storage device, a password can be held in a secure storage unit of the computing device. An example of such a secure storage unit is a Trusted Platform Module (TPM), in which data is stored either in a dedicated integrated circuit or in a secure part of an integrated circuit. The data is stored in a manner in which it is not easily accessible other than under specific conditions, such as being accessible to certain parts of the BIOS during the boot process.

During the device's boot process, the BIOS can sense that the password should be input to enable decryption of the storage device and so may request the stored password from the secure storage.

To block unauthorised access to the encrypted data, for example by tampering with the BIOS, a system for checking that the BIOS is in an expected state may be applied. However, when a computer device is modified during an update process, the updates may alter the BIOS. In such a situation, the system for checking the BIOS may assume that this alteration is a result of an unauthorised access attempt. Upon detection of the supposed unauthorised access, a password may be requested before decryption of the data is permitted.

Input of the password may be, for example, via manual input or via some automatic input. Manual input of the password is cumbersome for the user since the password maybe rather long. Moreover, the user may store the password, for example by writing it down, and this compromises the security of the encryption system. Automatic password input can be implemented using a server device connected to the computer via a network. However, in the absence of an available network, such an automatic input would fail. Further, in a situation where a remote administrator is attempting to update a computing device over a network, an update that changed the BIOS may block the administrator from completing the update. This is because remote insertion of the password may not be possible.

The disclosure described herein may permit a recovery code for an electronic device to be input in a secure manner without divulging the recovery code to a user, and without requiring an administrator to intervene either at the device or remotely via a network connection.

Figure 1A:
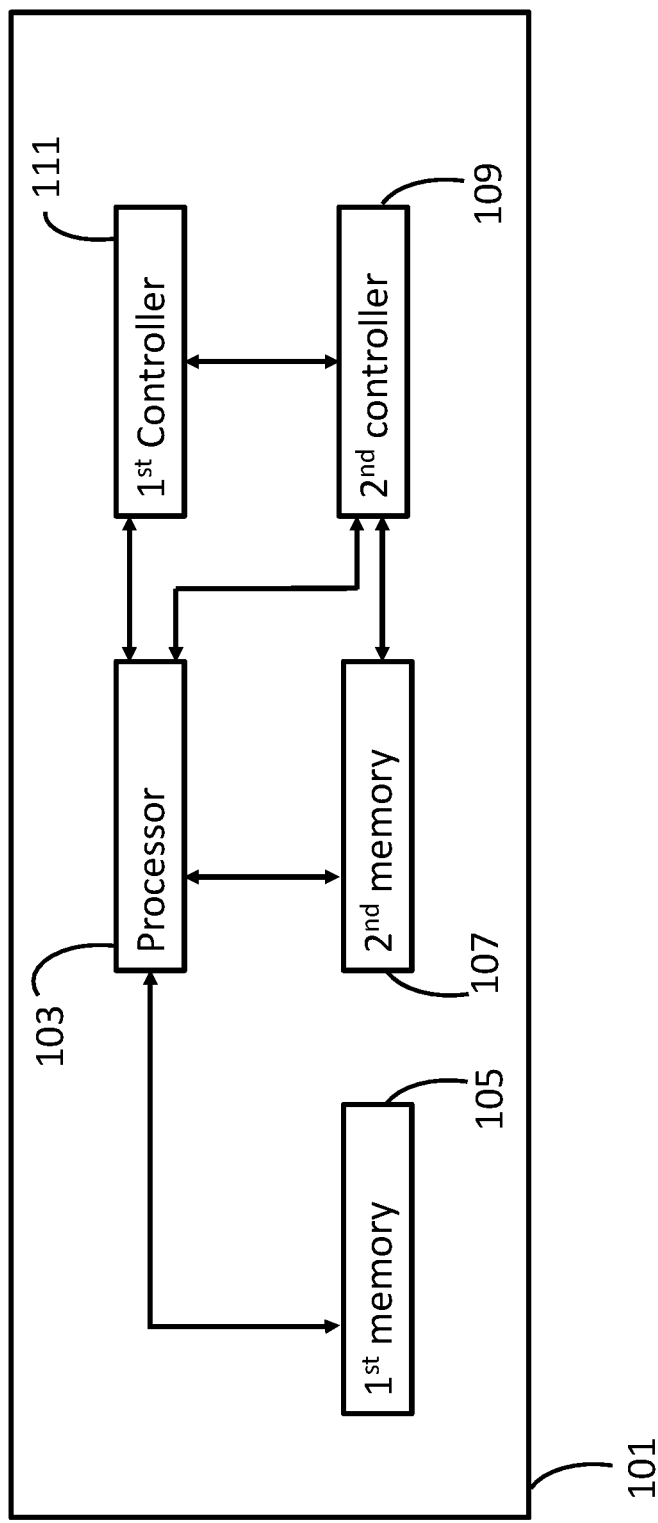
FIG. 1a is a block diagram of an example electronic device.

Referring to the Figures, FIG. 1a illustrates a block diagram of an example electronic device 101, such as a computer device. The electronic device 101 may comprise a processor 103, a first memory 105, a second memory 107, a first controller 111, and a second controller 109. The processor 103 is able to execute instructions that enable the performance of a task. The instructions may be stored on a non-transitory computer-readable storage medium. As used in this disclosure, the term "non-transitory" does not encompass transitory propagating signals.

As indicated in FIG. 1a, the processor 103 is able to communicate data between itself and each of the memories 105, 107, and also with each of the first controller 111 and second controller 109. The first controller 111 can also communicate with the second controller 109, and the second controller 109 can also communicate with the second memory 105.

Figure 1B:
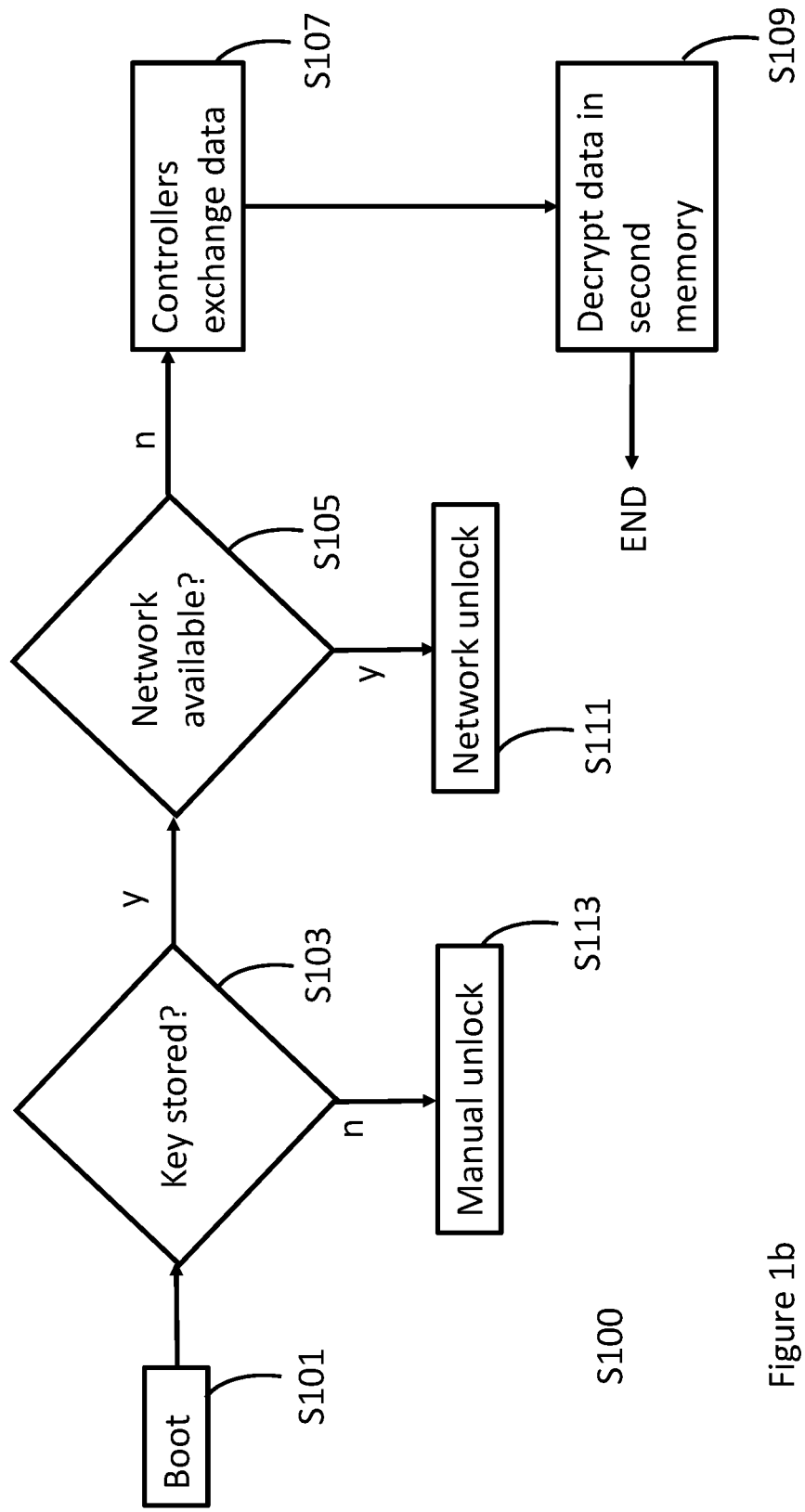

FIG. 1b illustrates an example method S100 of operation of the electronic device 101 of FIG. 1a. At S101 the electronic device 101 is booted from an inactive state. A boot process of the electronic device 101 may be the process by which the device is started up from an unpowered state. The boot process may, for example, involve the electronic device 101 running machine-readable instructions that initiates the system using a basic input/output system (BIOS).

Upon booting S101 of the electronic device 101, instructions are executed on the processor 103 of the device 101 to initiate the device 101. The device initiation may include instructions to obtain data from the second memory 107 to complete initiation of the electronic device 101.

In examples, the data to be obtained from the second memory 107 may comprise parts of an operating system for the electronic device 101, or other data for operation of the electronic device 101. The data in the second memory 107 is, in some examples, encrypted with an encryption system that renders the data unreadable to the processor 103 without prior decryption. As a result, when attempting to obtain the data from the second memory 107, the processor 103 may detect that there is a failure to decrypt the data from the second memory 107 if the decryption has been blocked.

In some examples, the cause of the failure to decrypt the data may be because machine readable instructions in the electronic device 101 have detected an event, such as a change to the device BIOS. Although such a change may occur merely as the result of an update made to the device software or hardware, such a change can also be representative of an indication that unauthorised access to the data has been attempted. Thus, for reasons of security, a change to the device BIOS may trigger a request for input of a password. Such a request may result in a failure to decrypt the data until the requested password is input.

As used herein, BIOS refers to hardware or hardware and instructions to initialize, control, or operate a computing device prior to execution of an operating system OS of the computing device. Instructions included within a BIOS may be software, firmware, microcode, or other programming that defines or controls functionality or operation of a BIOS. In one example, a BIOS may be implemented using instructions, such as platform firmware of a computing device, executable by a processor. A BIOS may operate or execute prior to the execution of the OS of a computing device. A BIOS may initialize, control, or operate components such as hardware components of a computing device and may load or boot the OS of computing device.

In some examples, a BIOS may provide or establish an interface between hardware devices or platform firmware of the computing device and an OS of the computing device, via which the OS of the computing device may control or operate hardware devices or platform firmware of the computing device. In some examples, a BIOS may implement the Unified Extensible Firmware Interface (UEFI) specification or another specification or standard for initializing, controlling, or operating a computing device.

At S103, the processor 103 determines whether the first memory 105 of the electronic device 101 has stored a private key for use in the decryption of data in the second memory 107.

A private key may be any private cryptographic key. In some examples the private key is from a public-private key pair generated by an algorithm for generating such keys. Thus, in these examples, the private key forms part of an asymmetric encryption system. In other examples, the private key may be a symmetric key wherein the same key can be employed for both encryption and decryption of data.

Processors, such as example processor 103, may include hardware devices such as Central Processor Units (CPUs), Embedded Controllers (ECs), other general processors and co-processors. As used herein, an EC corresponds to a controller device that is within an electronic device and that performs a processing task. Processors may also include software devices wherein one or more virtual processors are to operate on integrated circuits. Processors may include threads of software that operate on such an integrated circuit. As used herein, software is machine readable instructions. Such instructions are executable by a controller or a processor, such as processor 103. Processors may be remote from the physical computer device and connected to the computer device via a wired or wireless network connection. Processors may be single-core or multicore processors, and different controllers may be implemented on different cores of a multicore processor.

In some examples, where the processor 103 comprises an EC, then the EC may be to provide services that are available during boot-up of the electronic device. For example, the EC may be to provide network communication capability during the boot process, prior to loading of an operating system. Such network capability may include Ethernet, cellular communications such as 4G and 5G, Wi-Fi, Bluetooth, etc.

Memory devices 105, 107 of examples may include any electronic storage devices or memories including semiconductor-based random-access memory (RAM), magnetic discs, and magnetic tapes, optical discs. Memory devices may also include Read-Only Memory (ROM), such as semiconductor-based ROM. Memory devices may also include erasable programmable read-only memory (EPROM), and electronically erasable programmable read-only memory (EEPROM)

Memory devices 105, 107 may be integrated into the electronic device 101 or removable from it. Memory devices 105, 107 may also be partitioned into different sections, and so more than one of the memory devices as described in this disclosure may be implemented within a single physical device. Thus, for example, the first memory 105 and the second memory 107 may each be a partition of a single memory.

Memory devices 105, 107 may also be remote from the physical computer device, such as being present in a cloud storage device. Memory devices 105, 107 may also be secure devices wherein access to the memory is in some way limited or restricted. For example, memory devices 105, 107 may be inaccessible to a certain part e.g. a certain processor of the electronic device or may request a password be supplied before access is granted.

In some examples, the first memory 105 may be a secure memory wherein access to the memory is in some way limited or restricted. For example, a secure memory device may be inaccessible to a certain part e.g. processors of the electronic device, or may request a password be supplied before access is granted.

The storage of the private key may be accomplished prior to issuing the electronic device 101 to a user. For example, a system administrator may store the private key when first setting up the electronic device 101 for a user. The private key may also be stored via a local intervention of an administrator such as by manually storing the private key, for example using a universal serial bus (USB) memory device. Alternatively, the private key may be stored by remote intervention wherein an administrator stores the private key via a network connection.

At S105, the processor 103 determines whether a network connection is available to the electronic device 101. The network connection may be implemented via any networking technology, such as ethernet, Wi-Fi, cellular communications, or Bluetooth.

At S107, if the private key is stored, and in the absence of an available network connection, the processor 103 causes the first controller 111 to exchange data with the second controller 109 of the electronic device 101. Data transmitted by the first controller 111 during the exchange comprises an emulated network service response to decrypt the data in the second memory 107. The emulated response includes information derived using the stored private key. Thus, the first controller 111 uses the private key to generate the emulated network service response. The first controller 111 then provides this emulated response to the second controller 109 in a manner in which the response would be received at the second controller 109 if the response had been transmitted by the network service that is being emulated.

In some examples, the emulated network service response comprises instructions transmitted by the first controller 111 to the second controller 113 that correspond to instructions that would be transmitted by the first controller 111 during a process of unblocking decryption of data in the second memory 107 using a remote server. In some examples, the remote server that is being emulated corresponds to a Windows Deployment Service (WDS) server. In other examples the remote server that is being emulated corresponds to a Remote Authentication Dial-In User Service (RADIUS) server. An example of such emulation is described in relation to FIG. 2c.

In examples, at S109, the second controller 109 may then decrypt the data in the second memory 107 using data from the exchange.

In some examples if, at S107, it is determined that the private key is not stored, then, at S113, the processor 103 defaults to a state in which a manual unlock of the electronic device 101 may be performed. A manual unlock of the electronic device comprises insertion of a password or access code manually into the device, for example via a keyboard. In some examples, the processor 103 additionally or alternatively blocks booting of the electronic device 101 if the private key is not stored.

In some examples if, at S105, it is determined that a network connection is available to the electronic device 101, then the processor 103 performs a network unlock procedure wherein data is exchanged between the electronic device 101 and a remote server via the network connection. The data exchanged permits the remote server to supply credentials to the electronic device 101 to permit decryption of the data in the second memory 107.

In some examples, the processor 103 is further to determine whether a controller of the electronic device 101 has contacted an authentication server within a preset time period. If no such contact has been made, then the first controller 111 is to pause booting of the electronic device 101. Thus, control of decryption of the data in the second memory 105 is retained by the electronic device 101 even if no network connection is available.

In some examples, the first controller 111 is further configured to remove the private key from the first memory 105 in the absence of contact with the authentication server for the preset time period. In some examples, the authentication server is a WDS server.

In some examples, where the private key has been removed from the first memory 105, the first controller 111 is to receive a replacement private key when a network connection becomes available. In some examples, the replacement private key is the same private key that was deleted in the absence of the network connection for the preset time. In other examples, the replacement private key is a different private key.

In some examples, the first controller 111 is further to determine whether a revocation notification for the private key has been received. In examples, the revocation notification may be a message transmitted by a remote server indicating that the private key stored in the first memory 105, or a user of the electronic device 101, has been revoked. If such a revocation notification has been received, then the processor 103 may block booting of the electronic device 101. In some examples, the processor 103 may also remove the private key from the first memory 105. In further examples the processor 103 may disable other methods of performing unlocking of the data in the second memory 107 that are present on the electronic device 101.

In some examples, the determination of whether a revocation notification for the private key has been received is made using data received via a cellular network connection.

In some examples, if the revocation message has been received, the first controller 111 is to also delete the data in the second memory 107.

In some examples the exchange of data between the first controller 111 and the second controller 109 is effected using a shared memory that is accessible by both the first controller 111 and the second controller 109. In such examples, the first controller 111 is to pipe the data of the exchange through the shared memory.

In some examples, emulated network service response transmitted by the first controller corresponds to a response from a Remote Authentication Dial-In User Service (RADIUS) server. As used herein, a RADIUS server is a process running on a server device that is configured to maintain user profiles in a central database. In other examples, a Windows Deployment Service (WDS) server may be employed.

Figure 2A:
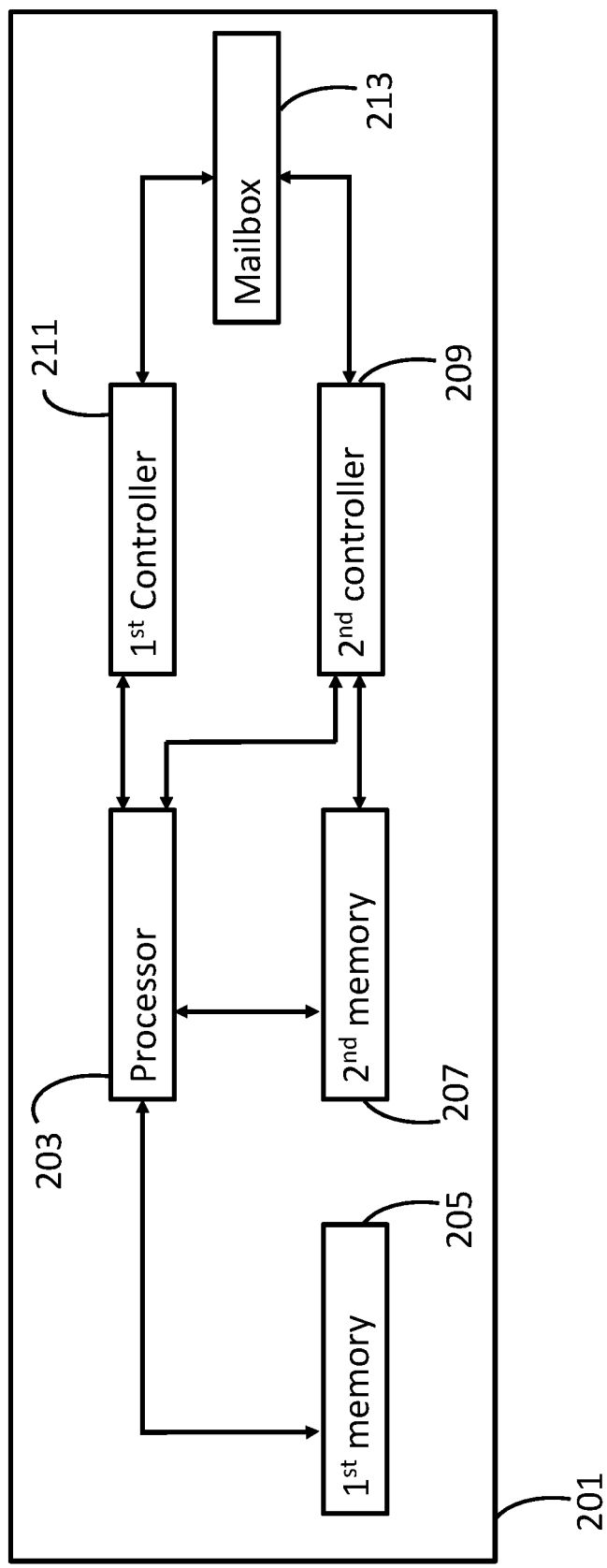
FIG. 2a is a block diagram of another example electronic device.

FIG. 2a illustrates a block diagram of another example electronic device 201, such as a computer device. The electronic device 201 may comprise a processor 203, a first memory 205, a second memory 207, a first controller 211, a second controller 209 and a mailbox memory 213. The processor 203 is able to execute instructions that enable the performance of a task. The instructions may be stored on a non-transitory computer-readable storage medium.

As indicated in FIG. 2a, the processor 203 is able to communicate data between itself and each of the memories 205, 207, and also with each of the first and second controllers 211, 209. The second controller 209 can also communicate with the second memory 207. In addition, the mailbox memory 213 is shared between the first 211 and second 209 controllers, and so both can read and write data in the mailbox memory. A mailbox memory may be any memory which is accessible to two or more processors, controllers or threads of software.

Figure 2B:
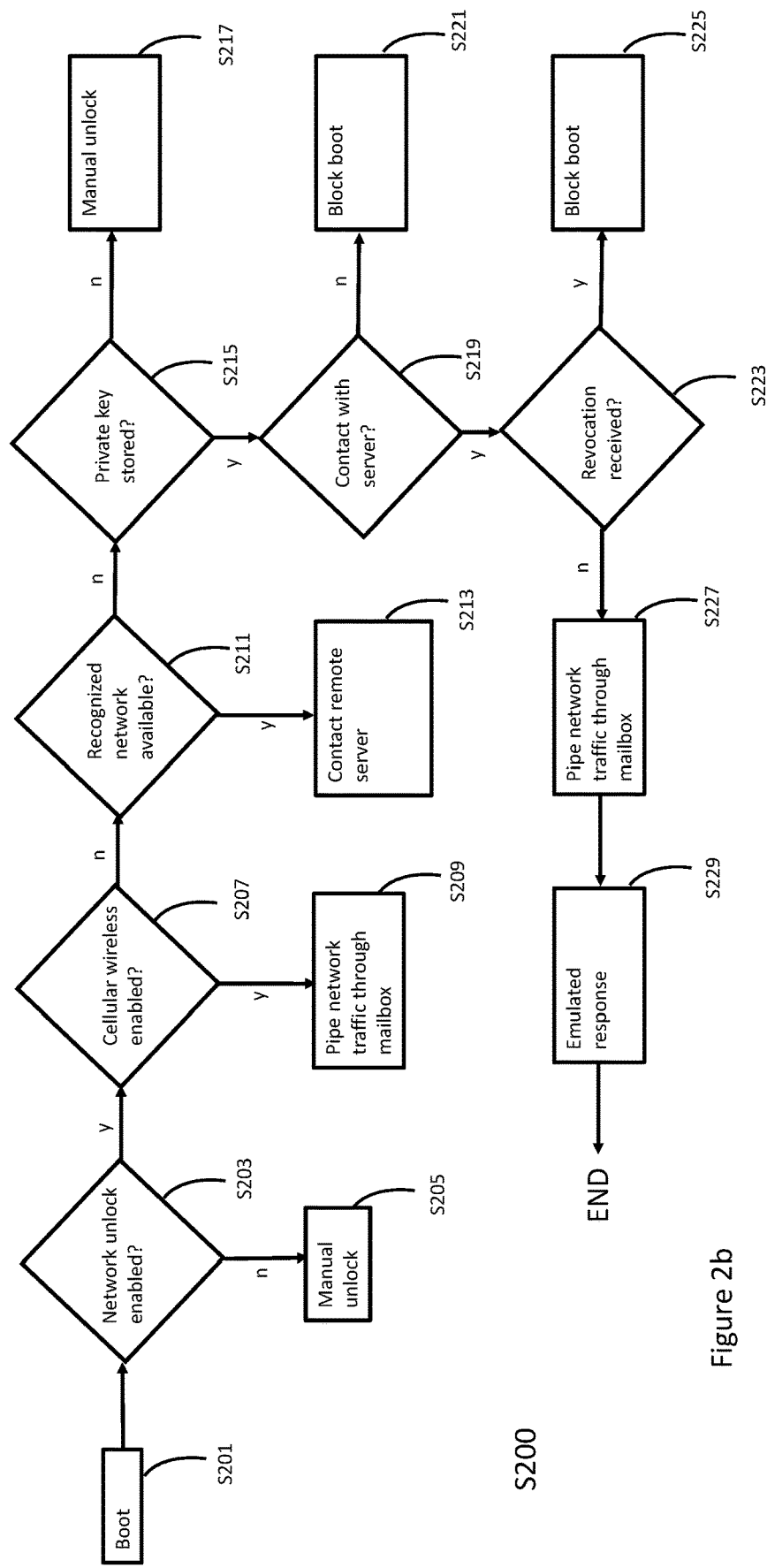

FIG. 2b illustrates an example method S200 of operation of the electronic device 201 of FIG. 2a. At S201 the electronic device 201 is booted from an inactive state as per S101 of FIG. 1b.

At S203, the processor 203 determines whether a mechanism for unblocking decryption of data in the second memory 205 via a network is enabled. In examples, the mechanism can comprise a system wherein data is exchanged with a remote server device that provides a network service response to decrypt the data in the second memory 207. In examples where the second memory 205 is encrypted using a Bitlocker system, the mechanism can comprise a network unlock system for Bitlocker.

At S205, if it is determined that a mechanism for unblocking decryption of data in the second memory 205 via a network is not enabled, then the electronic device 201 will default to a state in which a manual unlock of the electronic device 201 may be performed. In examples, the manual unlock comprises a requirement for a user to input a password to unlock the second memory 207. In alternative examples, the manual unlock comprises using a trusted platform module (TPM) which stores password information for unlocking the second memory 207.

At S207, if it is determined that a mechanism for unblocking decryption of data in the second memory 205 via a network is enabled, then the processor 203 determines whether a cellular wireless connection is available. In examples, the cellular wireless connection may be a 4G or 5G connection.

At S209, if it is determined that a cellular wireless connection is available, then the processor 203 configures the first controller 211 to pipe network traffic from the cellular wireless connection through a mailbox memory that is accessible to the first controller 211 and the second controller 209. The network traffic may include a message exchanged with a remote server such as a WDS server or a RADIUS server. By piping the network traffic through the mailbox memory 213, the first controller 211 can provide an instruction to the second controller 209 that enacts a mechanism for unblocking decryption of data in the second memory 205 via the cellular wireless connection. In examples where the second memory 205 is encrypted using a Bitlocker system, the mechanism can comprise a network unlock system for Bitlocker.

At S211, if it is determined that a cellular wireless connection is not available, then the processor 203 determines whether a recognized network is available. In examples, the recognized network may be a Wi-Fi network that has been previously registered with the electronic device 201 as a trusted network connection.

At S213, if it is determined that a recognized network is available, then the processor 203 contacts a remote server via the recognized network to perform an unlock procedure. In examples, the unlock procedure can comprise exchange of data with a remote server device that provides a network service response to decrypt the data in the second memory 207. In examples, the remote server device can be a Windows Deployment Service (WDS) server or a RADIUS server.

At S215, if it is determined that a recognized network is not available, then the processor 203 is configured to determine whether a private key is stored in the first memory 205.

At S217, if it is determined that a private key is not stored in the first memory 205, then, in examples, the processor 203 may default to a state in which a manual unlock of the electronic device 201 may be performed as described in relation to S205. In some examples, the processor 203 additionally or alternatively blocks booting of the electronic device 201.

At S219, if it is determined that a private key is stored in the first memory 205, then the processor 203 determines whether the electronic device has made contact with a remote server within a preset time. In examples, the preset time can be set when first setting up the electronic device 201 for a user. The preset time may also be set via a local intervention of an administrator such as by manually setting the preset time by, for example, using a universal serial bus (USB) memory device. Alternatively, the preset time may be set by remote intervention via a network connection.

At S221, if it is determined that the electronic device 201 has not made contact with a remote server within the preset time, then booting of the electronic device 201 is blocked. In examples, the blocking of the booting may be achieved by the first controller 211 blocking use of the stored private key to perform decryption of the data in the second memory 207. In some examples, the processor 203 also removes the private key from the first memory 205. In other examples, if contact with the remote server is later detected by the processor 203, the processor 203 may permit the first controller 211 to use the private key to allow decryption of the data in the second memory 205.

At S223, if it is determined that the electronic device 201 has made contact with a remote server within the preset time, then the processor determines whether a revocation notification has been received. In examples, the revocation notification may be a message transmitted by a remote server indicating that the private key stored in the first memory 205, or a user of the electronic device 201, has been revoked. If such a revocation notification has been received, then the processor 203 blocks booting of the electronic device 201. In some examples, the processor 203 also removes the private key from the first memory 205. In further examples the processor 203 disables other methods of performing unlocking of the data in the second memory 207 that are present on the electronic device 201.

At S225, if it is determined that a revocation notification has been received, then booting of the electronic device 201 is blocked. In examples, the blocking of the booting may be performed in the same manner as described in relation to S221.

At S227, if it is determined that a revocation notification has not been received, then the processor 203 configures the first controller 211 to pipe network traffic through the mailbox memory 213.

At S229, the first controller 211 exchanges data with the second controller 209. Data transmitted by the first controller 211 during the exchange comprises an emulated network service response to decrypt the data in the second memory 207. The emulated response includes information derived using the stored private key.

Figure 2C:
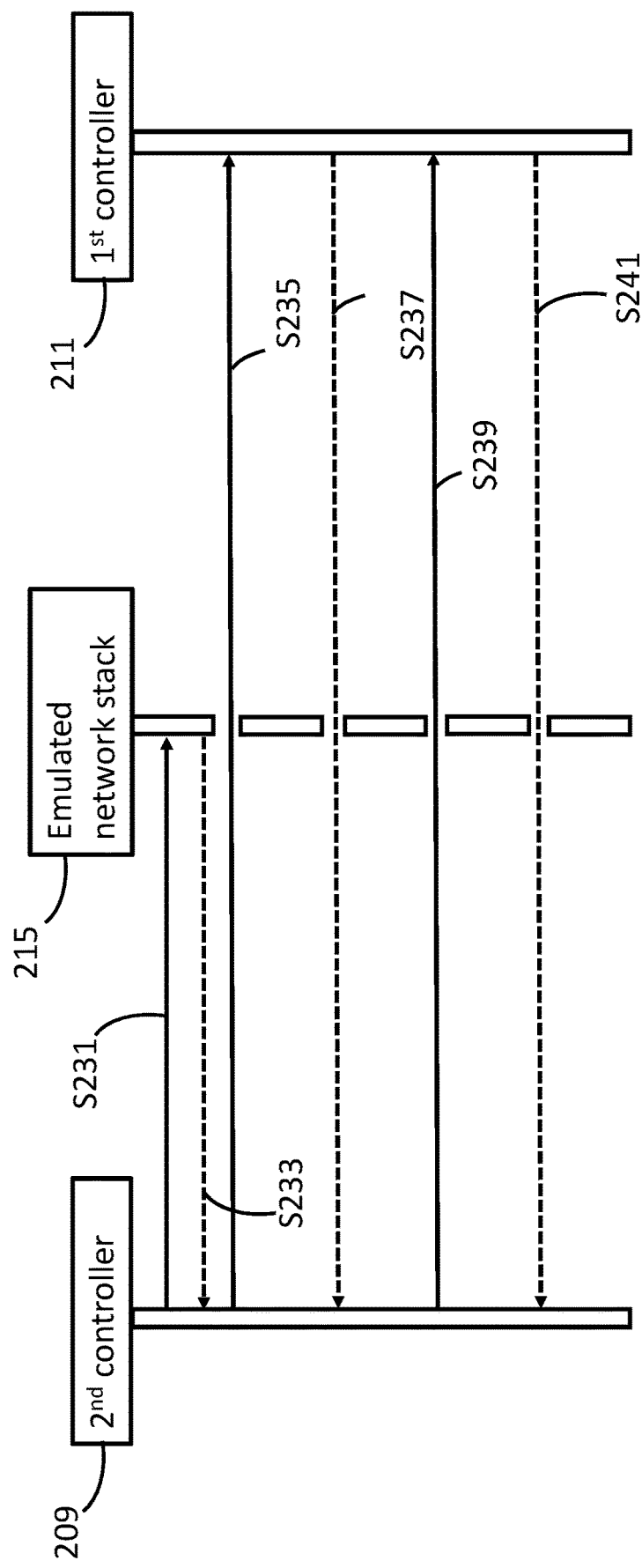
FIG. 2c illustrates further details of the method of operation of FIG. 2b

FIG. 2c illustrates further details of S229 of the example method S200 of operation of the electronic device 201 of FIG. 2a. FIG. 2c shows details of the emulated network service response at S229. In the example illustrated in FIG. 2c, the emulated network service response corresponds to a Remote Authentication Dial-In User Service (RADIUS) exchange.

The exchange takes place between the first controller 211 and the second controller 209. The first controller 211 provides an emulated network stack 215 that emulates the information that would be provided were a remote server providing a network unlock service to be present.

At S231, the second controller 209 transmits a dynamic host configuration protocol (DHCP) request to the emulated network stack 215. As used herein, a DHCP request corresponds to a message transmitted by the second controller 209 to a remote server over a network connection. The DHCP request requests network configuration data including an internet protocol (IP) address for the second controller 209.

At S233, DHCP response comprising an IP address is sent by the emulated network stack 215 to the second controller 209. In examples, the DHCP response comprises a dummy DHCP address.

At S235 the second controller 209 transmits a RADIUS access request to the address provided in the DHCP response.

At S237, the first controller 211 receives the RADIUS access request and transmits a RADIUS access challenge to the second controller 209. A RADIUS access challenge comprises a message sent by a RADIUS server requesting more information in order to allow access. Here, it is the first controller 211 emulating the RADIUS server that generates and transmits the challenge.

At S239, the second controller 209 transmits a RADIUS challenge response in response to the challenge. A RADIUS challenge response comprises a message sent to a RADIUS server. The message includes the information requested in the challenge request.

At S241, the first controller 211 transmits a RADIUS access accept message to the second controller 209. A RADIUS access accept message indicates that the access request has been accepted. In some examples, the message also comprises authentication data or a password that can be used by the second controller 209 to permit decryption of the data in the second memory 207. In further examples, the RADIUS access accept message comprises information indicating a data packet in which information to permit decryption of the data in the second memory 207 will be sent.

Figure 3A:
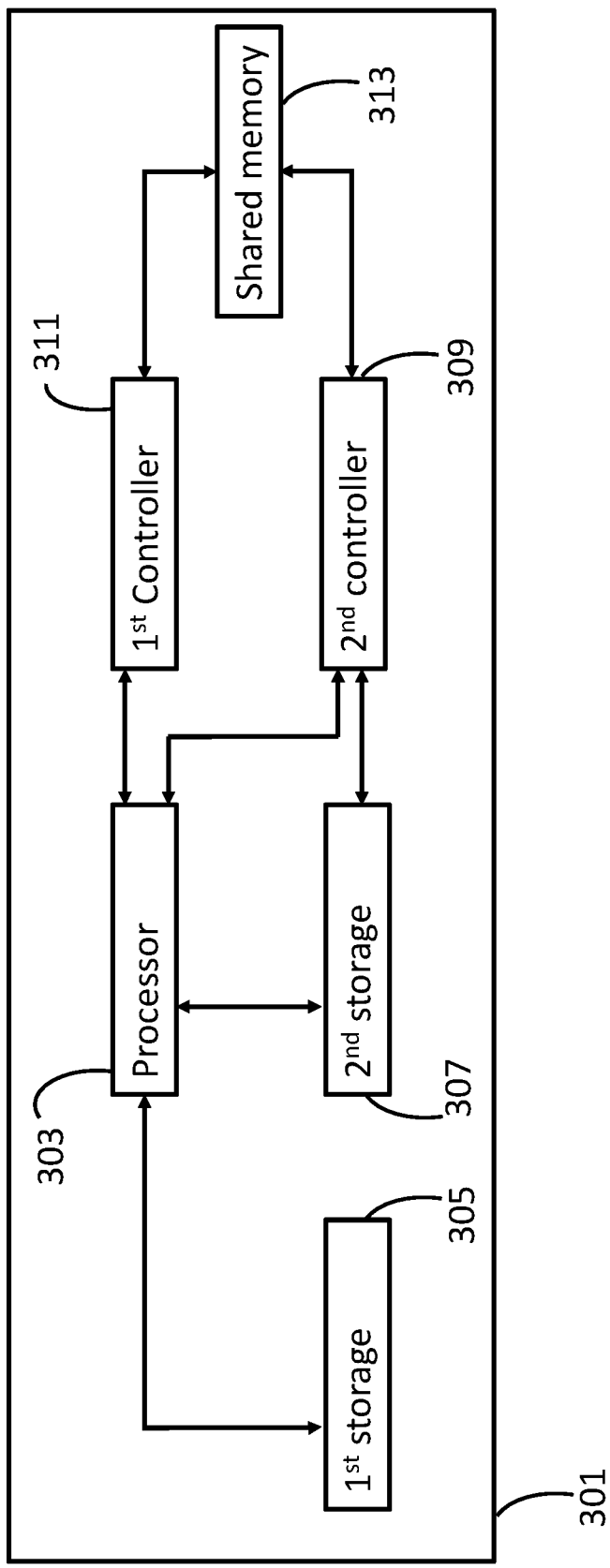
FIG. 3a is a block diagram of yet another electronic device.

FIG. 3a illustrates a block diagram of another example electronic device 301, such as a computer device. The electronic device 301 may comprise a processor 303, a first storage 305, a second storage 307, a first controller 311, a second controller 309 and a shared memory 313. The processor 303 is able to execute instructions that enable the performance of a task. The instructions may be stored on a non-transitory computer-readable storage medium.

As indicated in FIG. 3a, the processor 303 is able to communicate data between itself and each of the storages 305, 307, and also with each of the first controller 311 and second controller 309. The second controller 309 can also communicate with the second storage 307. In addition, the shared memory 313 is shared between the first controller 311 and second controller 309. The shared memory may be any memory which is accessible to two or more processors, controllers or threads of software.

The first storage 305 and the second storage 307 may correspond to memory devices as defined herein.

Figure 3B:
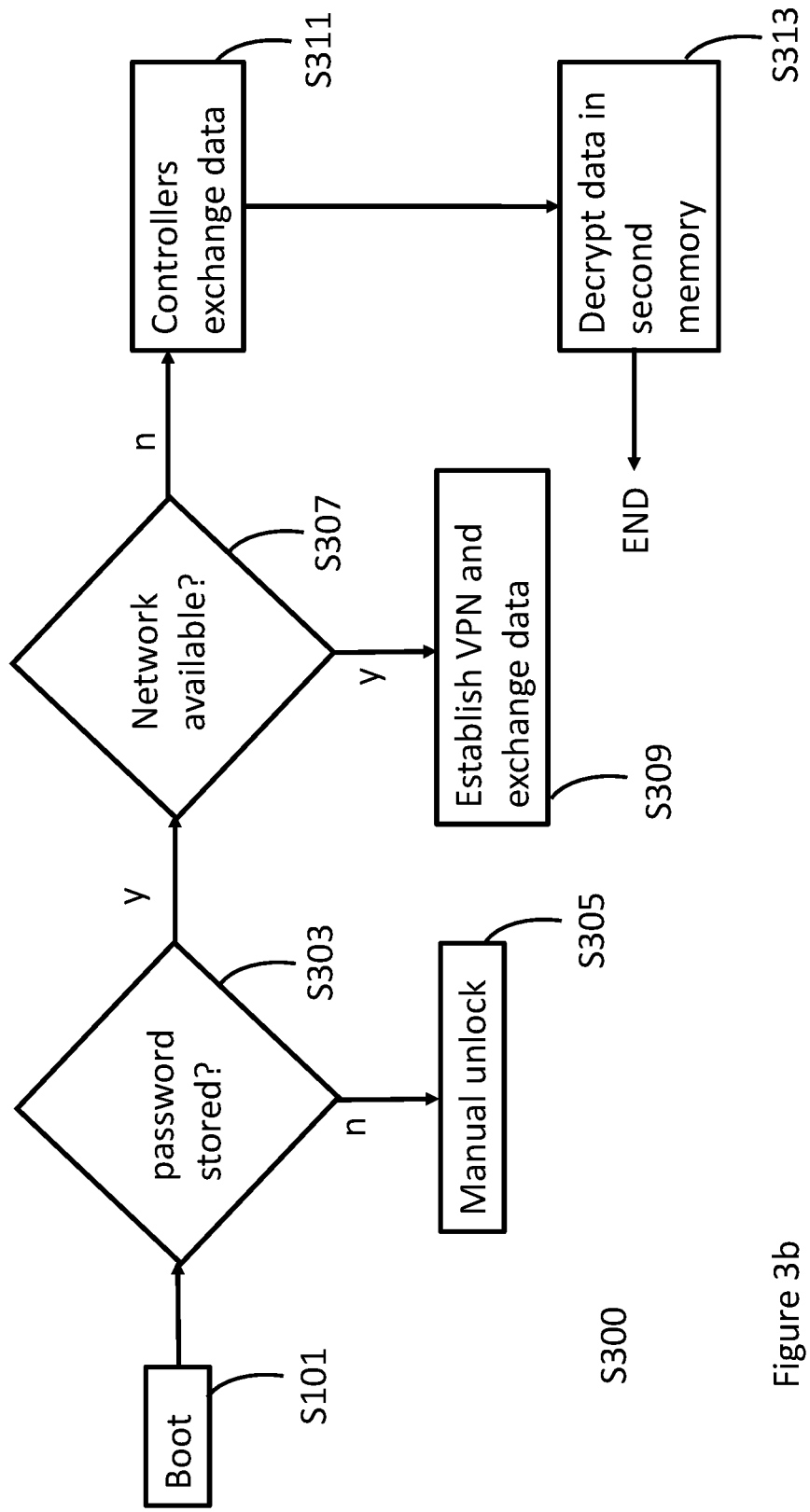

FIG. 3b illustrates an example method S300 of operation of the electronic device 301 of FIG. 3a. At S301 the electronic device 301 is booted from an inactive state.

Upon booting S301 of the electronic device 301, instructions are executed on the processor 303 of the device 301 to initiate the device 301. The device initiation may include instructions to obtain data from the second storage 307 to complete initiation of the electronic device 301.

In examples, the data to be obtained from the second storage 307 may comprise parts of an operating system for the electronic device 301, or other data for operation of the electronic device 301. The data in the second storage 307 is, in some examples, encrypted with an encryption system that renders the data unreadable to the processor 303 without prior decryption. As a result, when attempting to obtain the data from the second storage 307, the processor 303 may detect that there is a failure to decrypt the data from the second storage 307 if the decryption has been blocked.

In some examples, the cause of the failure to decrypt the data may be because machine readable instructions in the electronic device 301 have detected an event, such as a change to the device BIOS. Although such a change may occur merely as the result of an update made to the device software or hardware, such a change can also be representative of an indication that unauthorised access to the data has been attempted. Thus, for reasons of security, a change to the device BIOS may trigger a request for input of a password. Such a request may result in a failure to decrypt the data until the requested password is input.

At S303, the processor 303 determines whether the first storage 305 of the electronic device 301 has stored a password for accessing data in the second storage 307.

A password may be a private cryptographic key. In some examples the private key is from a public-private key pair generated by an algorithm for generating such keys. Thus, in these examples, the private key forms part of an asymmetric encryption system. In other examples, the private key may be a symmetric key wherein the same key can be employed for both encryption and decryption of data.

The storage of the password may be accomplished prior to issuing the electronic device 301 to a user. For example, a system administrator may store the password when first setting up the electronic device 301 for a user. The password may also be stored via a local intervention of an administrator such as by manually storing the password, for example using a universal serial bus (USB) memory device. Alternatively, the password may be stored by remote intervention wherein an administrator stores the password via a network connection.

At S307, the processor 303 determines whether a network connection is available to the electronic device 301. The network connection may be implemented via any networking technology, such as ethernet, Wi-Fi, cellular communications, or Bluetooth.

At S309, if a network connection is available, the processor 303 establishes a virtual private network (VPN) with a remote server. As used herein, the term establish a VPN comprises forming a link between the processor 303 and a remote server such that data can then be exchanged over the link. The VPN encrypts data transmitted via the link.

Once the VPN is established, the processor 303 exchanges data with the remote server by piping data of the exchange through a memory that is accessible to the first controller 311.

At S311, if the password is stored and, in the absence of an available network connection, the first controller 311 exchanges data with the second controller of the electronic device 301. Data transmitted by the processor 303 during the exchange comprises at least one emulated response from a networked service to access the data in the second storage 307. The at least one emulated response includes information derived using the password to thereby identify the electronic device 301.

In some examples, the emulated network service response comprises instructions transmitted by the first controller 311 to the second controller 309 that correspond to instructions that would be transmitted by the first controller 311 during a process of unblocking decryption of data in the second storage 307 using a remote server. In some examples, the remote server that is being emulated corresponds to a Windows Deployment Service (WDS) server. In other examples, the remote server that is being emulated corresponds to a RADIUS server.

In examples, at S313, the second controller 309 may then decrypt the data in the second storage 307 using data from the exchange.

In some examples if, at S303, it is determined that the password is not stored, then, at S305, the processor 303 defaults to a state in which a manual unlock of the electronic device 301 may be performed. The manual unlock may be as described in relation to S205. In some examples, the processor 303 additionally or alternatively blocks booting of the electronic device 301.

In some examples, the information derived using the password comprises a digital certificate. As used herein a digital certificate may be a certificate that is generated using the password stored in the first storage 305. Password may comprise a private encryption key.

Figure 4A:
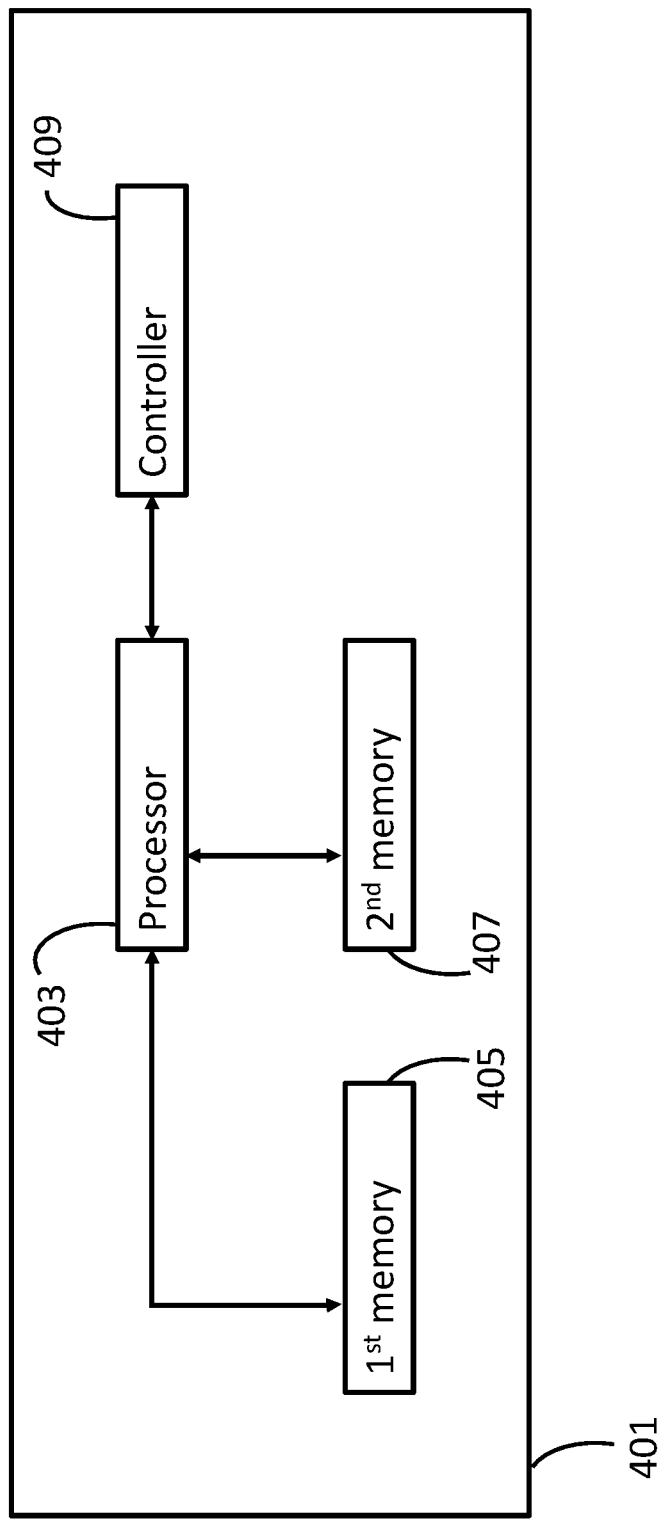
FIG. 4a is a block diagram of yet another electronic device.

FIG. 4a illustrates a block diagram of another example electronic device 401, such as a computer device. The electronic device 401 may comprise a processor 403, a first memory 405, a second memory 407, and a controller 409. The processor 403 is able to execute instructions that enable the performance of a task.

As indicated in FIG. 4a, the processor 403 is able to communicate data between itself and each of the memories 405, 407, and also with the controller 409.

Figure 4B:
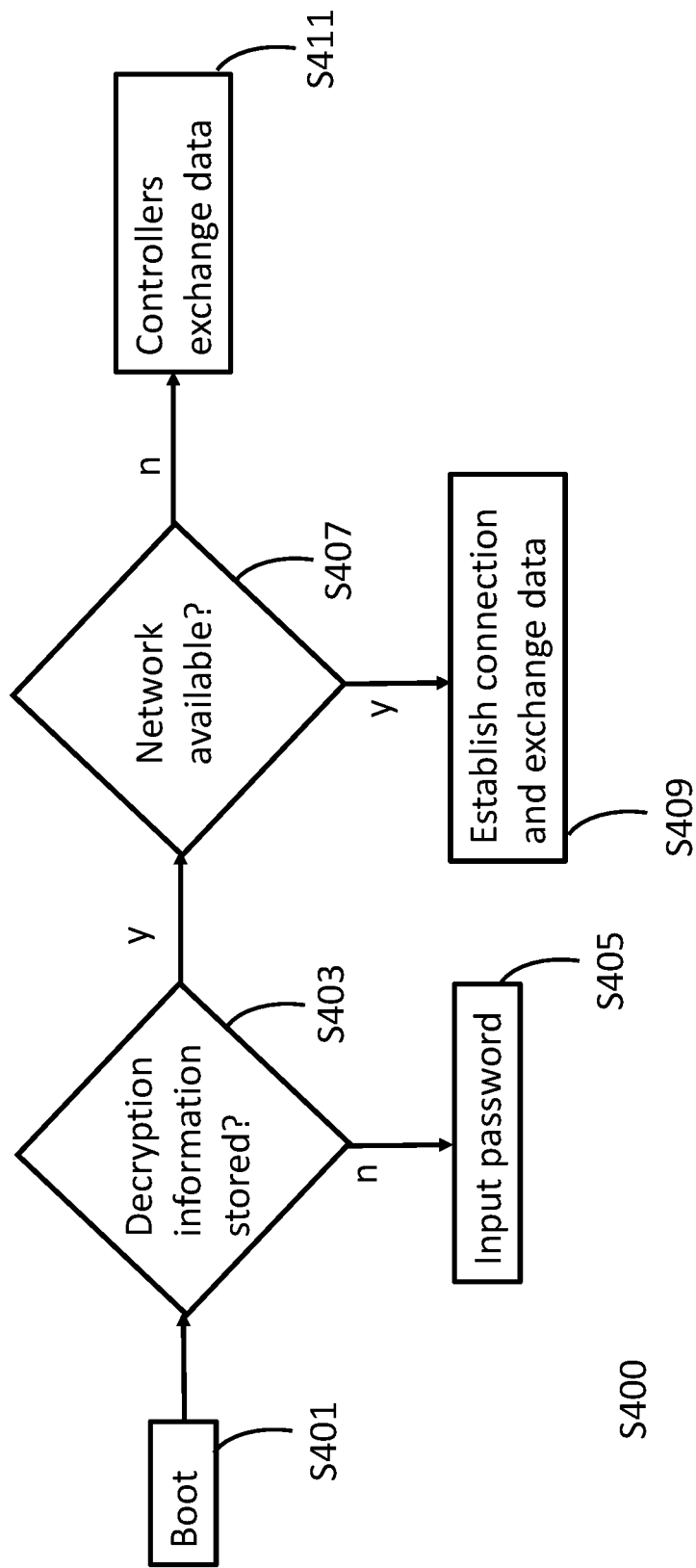

FIG. 4b illustrates an example method S400 of operation of the electronic device 401 of FIG. 4a. At S401 the electronic device 401 is booted from an inactive state.

Upon booting S401 of the electronic device 401, instructions are executed on the processor 403 of the device 401 to initiate the device 401. The device initiation may include instructions to obtain data from the second memory 407 to complete initiation of the electronic device 401.

In examples, the data to be obtained from the second memory 407 may comprise parts of an operating system for the electronic device 401, or other data for operation of the electronic device 401. The data in the second memory 407 is, in some examples, encrypted with an encryption system that renders the data unreadable to the processor 403 without prior decryption.

At S403, the processor 403 determines whether the first memory 405 of the electronic device 401 has stored a decryption information to decrypt data in the second memory 407.

Decryption information may be a digital certificate generated using a private cryptographic key. In some examples the private key is from a public-private key pair generated by an algorithm for generating such keys. Thus, in these examples, the private key forms part of an asymmetric encryption system. In other examples, the private key may be a symmetric key wherein the same key can be employed for both encryption and decryption of data.

At S405, if the decryption information is not present, the processor 403 prompts a user to input a password. The input of the password may be prompted to be made via a keyboard of the electronic device 401.

At S407, the processor 403 determines whether a wireless network connection is available to the electronic device 401.

At S409, if the decryption information is present and, in the presence of an available wireless network connection, the processor 403 is to establish a connection with an external server using the wireless network connection and exchange data with the external server to obtain information to decrypt data in the second memory 407. In some examples, data in the exchange includes the decryption information.

At S411, if the decryption information is present and, in the absence of an available wireless network connection, the processor 403 is to cause the controller 409 to generate an emulated response of the external server to decrypt the data in the second memory 407, the emulated response including information derived using the decryption information.

In some examples, the connection established with the external server employs a virtual private network (VPN) with the remote server.

In some examples, data exchanged via the established connection with the external server is routed through a mailbox memory that is accessible to the controller 409.

The preceding description has been presented to illustrate and describe certain examples. Different sets of examples have been described; these may be applied individually or in combination, sometimes with a synergetic effect. This description is not intended to be exhaustive or to limit these principles to any precise form disclosed. Many modifications and variations are possible in light of the above teaching. It is to be understood that any feature described in relation to any some examples may be used alone, or in combination with other features described, and may also be used in combination with any features of any other of the examples, or any combination of any other of the examples.

The invention claimed is:

1. A non-transitory computer-readable storage medium comprising instructions that when executed cause a processor of an electronic device to:
    determine, during a boot process of the electronic device, whether a first memory of the electronic device has stored a private key to decrypt data in a second memory; and
    determine whether a network connection is available to the electronic device;
the instructions further to:
    if the private key is stored and, in the absence of an available network connection, cause a first controller of the electronic device to exchange data with a second controller of the electronic device;
    wherein data transmitted by the first controller during the exchange comprises an emulated networked service response to decrypt the data in the second memory, the emulated response including information derived using the stored private key.

2. The non-transitory computer-readable storage medium of claim 1, wherein the processor is further to determine whether a controller of the electronic device has contacted an authentication server within a preset time period and, if not, the first controller to pause booting of the electronic device.

3. The non-transitory computer-readable storage medium of claim 2, wherein, in the absence of contact with the authentication server for the preset time period, the first controller is also to remove the private key from the first memory.

4. The non-transitory computer-readable storage medium of claim 3, wherein the first controller is also to receive a replacement private key when a network connection becomes available.

5. The non-transitory computer-readable storage medium of claim 1, wherein the first controller is to determine whether a revocation message for the private key has been received and, if so, the first controller to delete the private key from the first memory.

6. The non-transitory computer-readable storage medium of claim 5, wherein determination of whether a revocation message for the private key has been received is made using data received via a cellular network connection.

7. The non-transitory computer-readable storage medium of claim 5, wherein, if the revocation message has been received, the first controller is to also delete the data in the second memory.

8. The non-transitory computer-readable storage medium of claim 1, wherein the exchange of data between the first controller and the second controller is effected using a shared memory that is accessible by both the first controller and the second controller, wherein the first controller is to pipe the data of the exchange through the shared memory.

9. The non-transitory computer-readable storage medium of claim 8, wherein the emulated network service response transmitted by the first controller corresponds to a response from a Remote Authentication Dial-In User Service (RADIUS).

10. A non-transitory computer-readable storage medium comprising instructions that when executed cause a processor of an electronic device to:
    determine, during a boot process of the electronic device, whether a first data storage of the electronic device has stored a password for accessing data in a second data storage;
    determine whether a network connection is available to the electronic device;
    if a network connection is available, establish a virtual private network (VPN) with a remote server and exchange data with the remote server by piping data of the exchange through a memory that is accessible to a first controller; and
    if the password is stored and, in the absence of an available network connection, cause the first controller to exchange data with a second controller of the electronic device;
wherein the data transmitted by the first controller during the exchange comprises at least one emulated response from a networked service to access the data in the second data storage, the at least one emulated response including information derived using the password to thereby identify the electronic device.

11. The non-transitory computer-readable storage medium of claim 10, wherein the network connection is previously registered at the electronic device as a trusted network connection.

12. The non-transitory computer-readable storage medium of claim 10, wherein the information derived using the password comprises a digital certificate.

13. An electronic device comprising a processor, a first memory, a second memory, and a controller, the processor to:
   determine, during a boot process of the electronic device, whether the first memory contains decryption information to decrypt data in the second memory;
   determine whether a wireless network connection is available to the electronic device;
   if the decryption information is not present, the processor to prompt a user to input a password;
   if the decryption information is present and, in the presence of an available wireless network connection, the processor to establish a connection with an external server using the wireless network connection and exchange data with the external server to obtain information to decrypt data in the second memory; and
   if the decryption information is present and, in the absence of an available wireless network connection, the processor to cause the controller to generate an emulated response of the external server to decrypt the data in the second memory, the emulated response including information derived using the decryption information.

14. The electronic device of claim 13, wherein the established connection employs a virtual private network (VPN).

15. The electronic device of claim 13, wherein the emulated response is routed through a mailbox memory that is accessible to the controller.

* * * * *